United States Patent [19]

Prasse

[11] Patent Number: 5,004,907
[45] Date of Patent: Apr. 2, 1991

[54] CIRCUIT FOR DETERMINING POWER OF RECEIVED LIGHT HAVING SUPERIMPOSITION OF LOW FREQUENCY CURRENT

[75] Inventor: Karl-Heinz Prasse, Mittenwald, Fed. Rep. of Germany

[73] Assignee: Siemens Aktiengesellschaft, Berlin and Munich, Fed. Rep. of Germany

[21] Appl. No.: 407,741

[22] Filed: Sep. 15, 1989

[30] Foreign Application Priority Data

Sep. 15, 1989 [EP] European Pat. Off. ......... 88115133.6

[51] Int. Cl.$^5$ .............................................. H01J 40/14
[52] U.S. Cl. ............................... 250/214 AG; 455/619
[58] Field of Search ....... 250/214 L, 214 AG, 214 R; 356/223, 224; 455/263, 619

[56] References Cited

U.S. PATENT DOCUMENTS

| | | | |
|---|---|---|---|
| 2,862,109 | 11/1958 | Kruper | 250/211 |
| 4,236,069 | 11/1980 | Laughlin | 250/214 R |
| 4,399,565 | 8/1983 | Jarret et al. | 455/619 |
| 4,805,236 | 2/1989 | Urala | 455/619 |
| 4,870,369 | 9/1989 | Bartenstein et al. | 250/214 AG |

Primary Examiner—David C. Nelms
Assistant Examiner—Que Tan Le
Attorney, Agent, or Firm—Hill, Van Santen, Steadman & Simpson

[57] ABSTRACT

A circuit for providing a signal representing light power received by a photodiode of an optical receiver having control means for controlling the bias voltage of the photodiode, wherein a constant amplitude low frequency current signal is superimposed on the photoelectric current of the photodiode, the resulting low frequency voltage signal being rectified and made available at an output terminal.

20 Claims, 3 Drawing Sheets

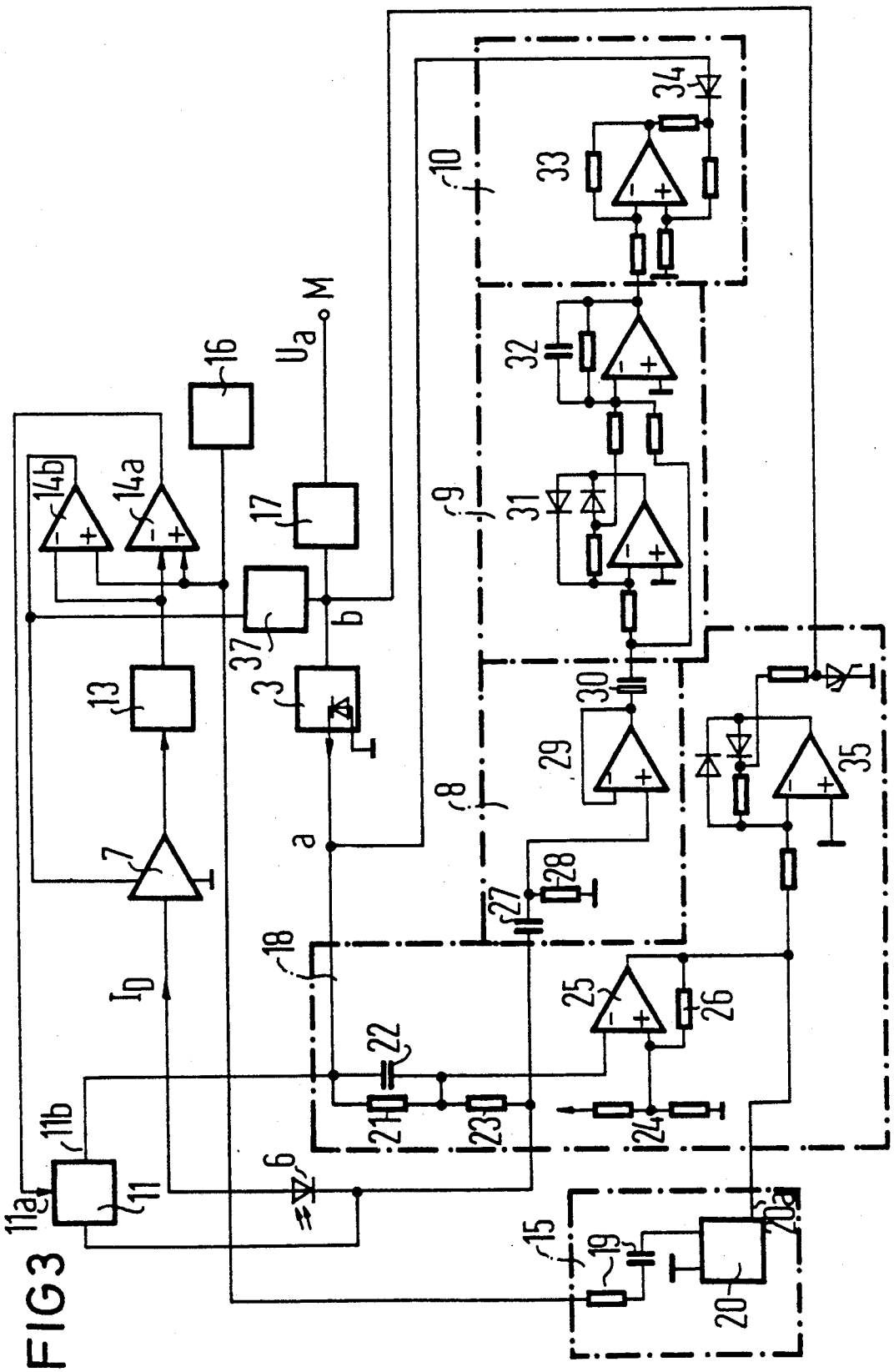

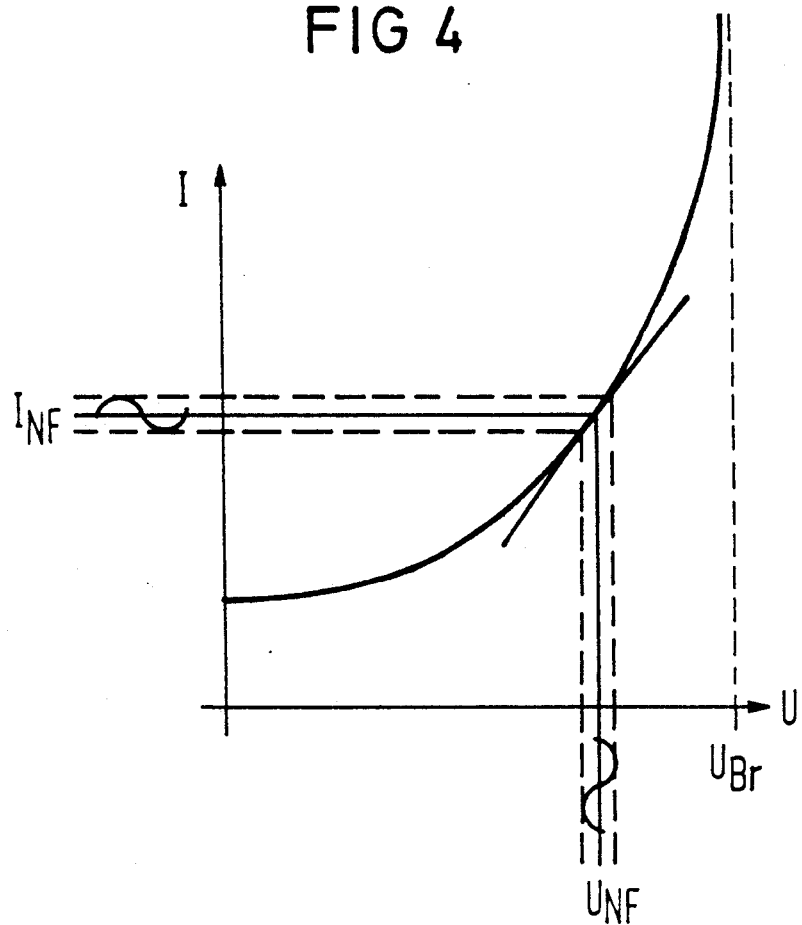

CIRCUIT FOR DETERMINING POWER OF RECEIVED LIGHT HAVING SUPERIMPOSITION OF LOW FREQUENCY CURRENT

BACKGROUND OF THE INVENTION

The present invention is generally directed to a circuit for determining light power. More specifically, the invention is directed to a circuit for determining light power received by a photodiode of an optical receiver wherein the bias voltage of the photodiode is controlled by a controller depending on the received light power.

In an article by E. Braun and B. Stummer, "Digitalsignaluebertragung auf Lichtwellenleitern im Fernnetz", Telcom report 10 (1987) Special [Issue] "Multiplex- und Leitungseinrichtungen", Pages 94 through 98, there is disclosed equipment for digital signal transmission via light waveguide cables that contain line terminating equipment and intermediate regenerators comprising optical transmitters and optical receivers. Due to attenuation of light signals in the waveguide cables, it is desirable to measure optical reception power in such optical communication transmission systems, particularly in those having great dynamics.

In an optical receiver including an avalanche photo diode (APD) that contains a control means for controlling the bias voltage of the APD, the bias voltage of the APD can be utilized for displaying the received light power. However, since the characteristic bias voltage curve varies greatly in view of the slope, it must be linearized by segment formation. Further, the characteristic curve has an extremely steep slope given high diode multiplication factors. As a result, it is nearly impossible to obtain sufficiently precise readings of the received light power for low light powers. Further, the evaluation of this characteristic curve is not suitable for the indication of the "no light" condition without great complications.

SUMMARY OF THE INVENTION

The present invention provides a circuit for determining power of received light. Further, the invention provides a test point at which a signal indicative of the received light power is available.

To these ends, the invention provides a circuit including an optical receiver having a photodiode, wherein the bias voltage of the photodiode is controlled by a control means depending on the light power received; a modulator with whose assistance a low-frequency current having a constant amplitude is superimposed on the photoelectric current of the photodiode; and a rectifier arrangement coupled to the photodiode, the rectifier arrangement rectifying the low-frequency voltage resulting from the superimposed, low-frequency current, the output of the rectifying arrangement being transmitted to an output terminal for connection thereto of a display means.

In accordance with the invention, the change of the bias voltage of the photodiode is measured. The measurement is not based on the characteristic curve of the photodiode itself, but on the differential quotient of the characteristic. As a result of an evaluation of the differential quotient, an indication of the received light power becomes nearly independent of the signal-to-noise ratio and can therefore also serve for indicating a "no light" condition or, for indicating extremely low light powers.

The circuit of the present invention is equally suitable for different types of photodiodes, but particularly for germanium-APD or SAM-APD (quaternary) APDs.

In an embodiment, the logarithm of the differential quotient of the characteristic is the factor of interest, so that a logarithmic relationship between the indication voltage and the light power results.

In an embodiment, a current adder is placed in series with the photodiode to serve as the modulator. This current adder superimposes an impressed current having a comparatively low frequency on the diode forward current.

When the optical receiver includes a control means that maintains a constant diode current within a frequency range prescribed by the limit frequency of the closed control circuit, then in an embodiment, the modulation of the photodiode current is accomplished by supplying the input of the control means with a low-frequency voltage whose frequency is lower than the limit frequency of the closed control circuit.

The invention will become more apparent with reference to the following detailed description of the presently preferred embodiments and the attached drawings.

BRIEF DESCRIPTION OF THE DRAWINGS

FIG. 3 is a schematic diagram illustrating further details of the circuit of FIG. 2; and FIG. 4 is a graph illustrating a characteristic voltage/current response curve of a photodiode.

DETAILED DESCRIPTION OF THE PRESENTLY PREFERRED EMBODIMENTS

Figure 1:
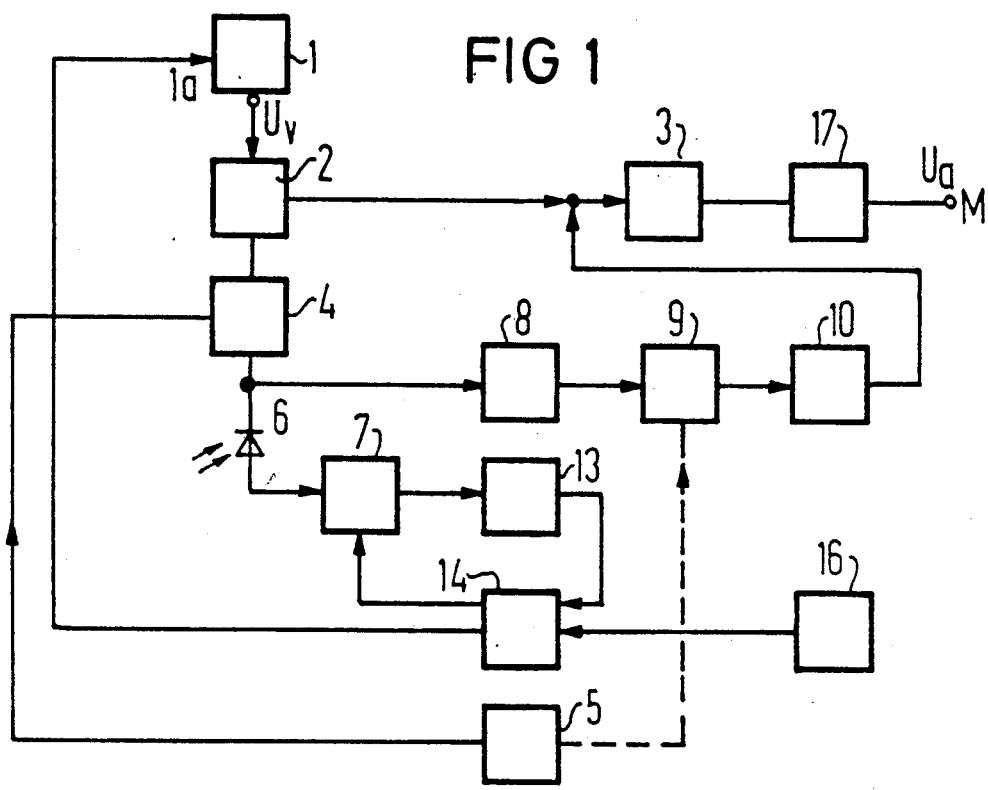
FIG. 1 is a schematic diagram illustrating a circuit embodying principles of the invention comprising a current adder arranged in series with a photodiode for superimposition of a low-frequency voltage.

Embodiments of the invention are set forth in the figures. For the purposes of enabling fuller comprehension of the following detailed description, identification of reference symbols of various variables and constants is presented below.

The variables and constants occurring throughout the following description include:

| Variable or Constant | Description |
| --- | --- |
| $I_D$ | photodiode photoelectric current |
| $I_S$ | photodiode forward biased current |
| a | constant |
| b | conversion factor of light power-to-photoelectric current |
| $P_L$ | incident light power |
| M | photodiode multiplication factor |
| $U_{Br}$ | photodiode breakdown voltage |
| U | photodiode bias voltage |
| $U_a$ | display voltage |
| C1 | constant calculated for given a, b, and $I_D$ |
| C2 | constant calculated for a given C1, $I_D$, and $\Delta I_D$ |
| d | constant calculated for a given a, b, and $I_D$ |

As a preliminary matter, certain relationships between the variable and constants must be explained. In the circuits illustrated in the figures, a low-frequency current $I_{NF}$ having a constant amplitude is superimposed on the photoelectric current $I_D$ of a photodiode, which photodiode serves as a reception diode of an optical receiver. When light power $P_L$ is received, a bias voltage U is caused to change. The change in the bias voltage U of the photodiode is measured, rectified, and then logarithmized. An output of the logarithmizer is coupled to an output jack at which the output can be measured by means of a linear volt meter coupled to the jack.

The following relationship exists between the photoelectric current $I_D$, the bias voltage U and the light power $P_L$:

$$P_L = b \cdot I_S$$

$$I_D = M \cdot I_S = \frac{I_S}{1 - \left(\frac{U}{U_{Br}}\right)^a}$$

References a, b, and M are constants identified above. When the above equation is rearranged to extract the value of U, the following equation results:

$$U = U_{Br}\left(1 - \frac{I_S}{I_D}\right)^{1/a}$$

Taking the derivative of both sides with respect to the change in current $I_D$, the following equation is produced:

$$\frac{dU}{dI_D} = \frac{U_{Br}}{I_D^2 a} \cdot \frac{I_S}{(1 - I_S/I_D)^{1 - 1/a}} = \frac{U_{Br}}{I_D^2 ab} \cdot \frac{P_L}{(1 - P_L/bI_D)^{1 - 1/a}}$$

By using empirical approximation methods, this last equation can be converted into the following:

$$\frac{dU}{dI_D} = \frac{U_{Br}}{I_D^2} \cdot C1(P_L)^d$$

; where C1 and d are calculated constants.

When the voltage dU is logarithmized, a linear relationship between the light power in dB and the display voltage $U_a$ is obtained.

When the multiplication factor M of the APD is controlled such that the product $M \cdot I_S = I_D$ is kept constant, then, when a constant $\Delta I_D$ is added, the display voltage $U_a$ can thus be expressed as follows:

$U_a = \log(U_{Br} C2) + \log P_L = K + \log P_L$, where K is a unit-dependent constant and C2 is calculated via the following equation:

$$C2 = \frac{C1 \Delta I_D}{I_D^2}$$

On the basis of simple equation balancing, the unit-dependent constant K can be taken into consideration in the display. The temperature dependency of this constant K leading to negligible display errors.

$U_{Br} = U_{Br}$ (25° C.) $(1 + \epsilon \Delta T)$ with $\epsilon = 0.15\%/°C$.

Given a change in temperature over 70° C., $\Delta T = 70°$ C. (e.g., 10° C. through +60° C.), a modification of the breakdown voltage of 10% results. Thus, a misindication of only 1 dB also results.

The relationships between the various constants and variables having been explained, a description of the illustrated embodiments is presented.

In FIG. 1, there is illustrated a circuit arrangement for determining the light power that is received by a photodiode 6. The photodiode 6 is coupled to an input of a radio-frequency amplifier 7 that belongs to an electro-optical receiver. The bias voltage U of the photodiode 6 is supplied by a suitable means 1 for generating bias voltage. The means 1 belongs to a control means that controls the bias voltage of the photodiode 6 depending upon the light power the photodiode 6 receives.

The control means contains a peak value rectifier 13 connected to an output of the radio-frequency amplifier 7 and contains a regulator 14. The regulator 14 has its actual value input connected to an output of the peak value rectifier 13 and has its rated value input connected to a rated value generator 16. An output of the regulator 14 is conducted to a control input 1a of the means 1 for generating bias voltage. The peak value of the radio-frequency useful signal current is regulated to a constant value in this way.

Further, it can be appreciated that the product $M \cdot I_S = I_D$ is kept constant in this way.

As needed, known circuits can be utilized for this modulation.

A series circuit comprising a means 2 for measuring current and of a current adder 4 is connected between the output of the means 1 for generating bias voltage and the photodiode 6. The current adder 4 is connected to an output of a low-frequency generator 5 and thus adds a low-frequency current having a constant amplitude to the radio-frequency useful signal current. The amplitude of the low-frequency current is selected to be so small so that the signal-to-noise ratio or, respectively, the bit error rate of the photodiode current is not significantly deteriorated.

An impedance converter 8 whose output is coupled to an input of a rectifier means 9 is connected to the cathode of the photodiode 6 that carries the bias voltage. The output of the rectifier 9 is coupled to a voltage-to-current converter 10. An output of the means 2 for measuring current and an output of the voltage-to-current converter 10 are coupled in common to an input of a logarithmizer 3. An output M of the illustrated circuit arrangement is coupled to an output of the current-to-voltage converter 17 that, in turn, is coupled to an output of the logarithmizer 3.

The low-frequency differential voltage dU to be measured that results from the superimposition of the low-frequency current is rectified in the rectifier means 9. The rectifier means 9 preferably is a synchronous rectifier circuit or a multiplier.

Whenever the rectifier means 9 comprises a synchronous rectifier, an additional input of the rectifier means 9 to which the low-frequency auxiliary signal is supplied is connected to the low-frequency generator 5. This embodiment is illustrated in FIG. 1 via a dashed line connection of the rectifier means 9 to the low-frequency generator 5.

So that following control circuits are not disturbed and limiting effects are kept away from the measuring circuit, the modulation is expediently shut-off below a variable multiplication factor M, for example for values of M<1.1. Control circuits that are provided in the radio-frequency amplifier 7, particularly for gain control, are to be taken into consideration as following control circuits.

For displaying higher light powers, the diode current $I_D$ is directly measured with the assistance of the means 2 for measuring current beginning with a multiplication factor of M=1. Since this current covers a plurality of decades, the logarithmized value of this current is displayed. The current logarithmizer required for this purpose is thereby doubly utilized in that the change in bias voltage dU is converted into a corresponding current with the assistance of the voltage-to-current converter 10 and is supplied to the current logarithmizer 3.

A suitable logarithmizer that forms the logarithm of its input current is known, for example, from the book by J. G. Graeme, G. E. Tobey and L. P. Huelsman, "Operational Amplifiers, Design and Applications", McGraw-Hill Book Company, 1971, pages 26–263.

Figure 2:
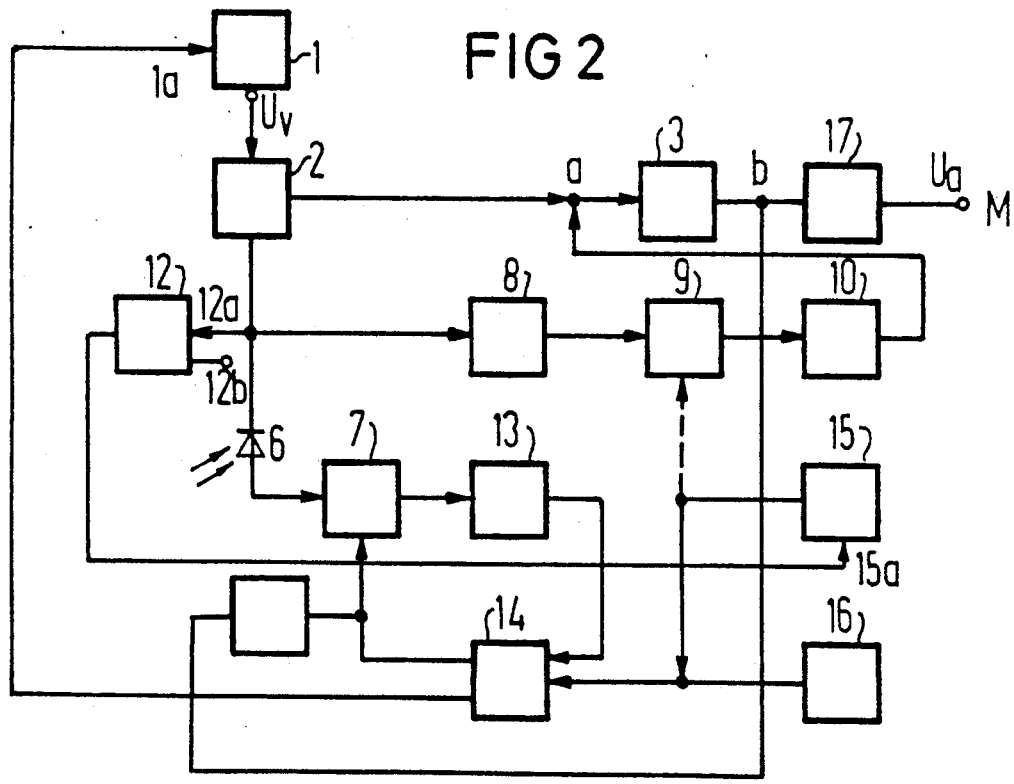
FIG. 2 is a schematic diagram illustrating a circuit embodying principles of the invention and comprising a photodiode wherein a low-frequency voltage is superimposed on the rated value of a regulator.

The circuit arrangement illustrated in FIG. 2 largely coincides with that of FIG. 1. In a departure therefrom, the rated voltage supplied by the rated value generator 16 has an output voltage of a low-frequency generator 15 superimposed on it. The frequency of the low-frequency generator 15 is selected such that it lies below the cut-off frequency of the regulator. The change in bias voltage that arises can therefore not be suppressed by the regulator. A superimposition of the low-frequency current $I_D$ thus derives in a simple way in that a low-frequency voltage is added to the rated value of the control voltage. The advantage of such a procedure lies in that no operation need be performed on the high-voltage side of the photodiode.

In a further deviation from FIG. 1, the current adder 4 is replaced by a through connection.

A comparator 12 also is provided. Together with the impedance converter 8, this comparator 12 is connected to the cathode of the photodiode 6. The comparator 12 compares the voltage adjacent to the photodiode 6 to a shut-off voltage supplied to an input 12b and has its output conducted to a control input 15a of the low-frequency generator 15.

The means 2 for measuring current is not suitable for values of the multiplication factor M>1 since the "no light" current that lies on the order of magnitude of the photo-electric current is multiplied. When the multiplication factor M becomes M greater than 1, the comparator 12 switches the low-frequency generator 15 on.

In the circuits of FIGS. 1 and 2, the product $M.I_S = I_D$ is kept constant.

In the circuits that do not keep the product $M.I_S = I_D$ constant, but set an optimum multiplication factor M for every light power, display errors that arise as a result can be left out of consideration. In particular, the display voltage therein can be acquired from the control circuit in an extremely simple way.

The circuit illustrated in FIG. 3 largely coincides with that of FIG. 2 but includes further details. The current $I_D$ flows from a means 11 for generating bias voltage through the photodiode 6 and an input resistor (not illustrated) of the radio-frequency amplifier 7 to ground, and flows back to a terminal 11b of the means 11 from ground via a diode connected to the input of the logarithmizer 3. The terminal 11b of the means 11 lies at a further reference potential. A voltage divider comprising resistors 21 and 23 is connected between the terminal of the means 11 carrying the bias voltage and the terminal 11b. The current flowing through this voltage divider therefore does not influence the measurement of the current $I_D$ by the logarithmizer 3.

A shut-off means 18 contains the voltage divider comprising the resistors 21 and 23 that is arranged in series with the photodiode 6 and is traversed by the diode current. A capacitor 22 is connected in parallel to the resistor 21 and is positioned at a side of the voltage divider facing away from the photodiode 6. The bias voltage of the photodiode 6 is adjacent at the voltage divider. The resistor 21 is constructed as a variable resistor, so that the division ratio can be set. The tap of the voltage divider is connected to the negative input of an operational amplifier 25 whose plus positive input is coupled at the tap of a further voltage divider 24 that is connected to a rated voltage. The output of the comparator 25 that is augmented with the assistance of a resistor 26 to form a Schmitt trigger is connected to a control input 20a of a timer 20 contained in the low-frequency generator 15. When the bias voltage of the photodiode 6 falls below a prescribed value (M<1.1), then the timer 20 is stopped and no low frequency signal is supplied to the regulator 14a, 14b. The timer 20 is stopped with the assistance of a shut-off signal applied to the control input 20a.

The impedance converter 8 contains an iterative circuit comprising a high-pass filter comprising a capacitor 27 and a resistor 28 and an operational amplifier 29. The operational amplifier 29 is connected to the cathode of the photodiode 6 via the capacitor 27 of the high-pass filter. The comparatively high bias voltage adjacent to the cathode of the photodiode 6 is therefore eliminated away from the input of the operational amplifier 29. The high-pass filter contains the capacitor 27 in a series arm and contains the high-impedance resistor 28 in a shunt arm following therefrom. The high-pass filter is dimensioned such that the low frequency deriving from the low-frequency generator 15 is allowed to pass.

The operational amplifier 29 is operated in emitter follower mode and comprises a relatively high resistance at its input and a relatively low resistance at its output. In this way, the impedance converter 8 assures that the impedance relationships at the photo-diode 6 are practically not influenced by the rectifier means 9. The rectifier 9 is connected to a capacitor 30 lying at the output of the impedance converter 8.

The rectifier means 9 contains an arrangement 31 for peak value rectification that is fashioned as an active, full-wave rectifier. The arrangement 31 for peak value rectification is followed by an arrangement 32 for filtering that, acts as active low-pass filter to filter the low frequency signal.

The voltage-to-current converter 10 that follows the arrangement 32 is realized by means of an operational amplifier 33. A diode 34 coupled to the output of the active voltage-to-current converter 10 effects a decoupling and is connected to the circuit point at the input of the logarithmizer 3, the current from the means 2 for current measurement and the current deriving from the voltage-to-current converter 10 summing up at this circuit point a.

The regulator 14 contains two controlled-gain amplifiers 14a and 14b that have their rated value positive inputs coupled to the output of shared rated value generator 16 and, via the RC series circuit 19, coupled to the output of the timer 20. The actual value negative inputs of the controlled-gain amplifiers 14a and 14b are tied in common and coupled to the output of a peak value rectifier 13. The controlled-gain amplifier 14a serves to control the bias voltage of the photodiode 6. The controlled-gain amplifier 14b controls the gain of the radio-frequency amplifier 7.

In addition to the control input of the radio-frequency amplifier 7, the setting voltage thereby generated is also conducted to the output of the logarithmizer 3 via a voltage-to-current converter 37. The control of the bias voltage of the photodiode 6 and of the gain of the amplifier 7 ensues such that the bias voltage is initially controlled given a low light power and the RF-gain of the amplifier 7 is controlled given increasing light power (M<1.1). The low-frequency generator 15 is shut-off in the latter case.

The output current of the logarithmizer 3, the output current of the voltage-to-current converter 38 and the output current of the constant current source 35 are added together at the circuit point b.

Given a low light power, particularly given a multiplication factor M greater than 1.1, the light power is measured with the assistance of the switch means comprising the impedance converter 8, the rectifier means 9, and the voltage-to-current converter 10. In this region of the received light power, the current flowing through the photodiode 6 itself can be neglected at the input of the logarithmizer 3. In comparison to the output current of the logarithmizer 3, the current supplied to the circuit point b by the constant current source 35 has the opposite polarity, so that a constant amount is subtracted from the output current of the logarithmizer 3. It thereby becomes possible that the input current of the logarithmizer 3 can be selected such that it is considerably higher than the photo current, i.e. such that the photo-current added per se at the circuit point a, however, remains without influence.

Since the slope of the characteristic is identified with the assistance of the switch means 8, 9 and 10, the light power display can also be utilized even given values lower than the minimum sensitivity of the system. In particular, the condition of "no light" can be indicated.

The lower current range that has been set forth is followed by a middle current range in which the measurement is based on the setting voltage supplied to the radio-frequency amplifier 7. This setting voltage is effective practically only at the circuit point d, since the constant current source 35 and the low-frequency generator 15 are shut off in this measuring range (M<1.1).

In an upper measuring range of the light power, the current the voltage-to-current converter 37 outputs to the circuit point b is constant since the limit of the range of control is reached at the radio-frequency amplifier 7. Only the diode photoelectric current $I_D$ supplied to the logarithmizer 3 is therefore effective. When the limit of the range of control of the radio-frequency amplifier 7 is reached, then the output voltage $U_a$ at the output M continues to rise given an increasing, received light power, since the rise of the output voltage of the logarithmizer 3 has a corresponding effect now at the circuit point b.

FIG. 4 shows the typical characteristic curve current/voltage of an APD. The characteristic curve of the APD is subject to relatively great unit scatters. Depending on the voltage $U_{Br}$, the characteristic breakover current avalanche thereby shifts parallel in the direction of the voltage axis. This deviation can amount to several volts. Since the characteristic curve is preserved and only the position in the direction of the voltage axis is different, the measured result that is based on the slope of the characteristic remains advantageously independent of the said offset of the characteristic.

While a preferred embodiment has been shown, modifications and changes may become apparent to those skilled in the art which shall fall within the spirit and scope of the invention. It is intended that such modifications and changes be covered by the attached claims.

I claim as my invention:

1. A circuit for determining light power received by a photodiode of an optical receiver, wherein bias voltage of said photodiode is controlled by a control means depending on the received light power, comprising:
   (a) modulation means for superimposing a low-frequency current having a constant amplitude on a photoelectric current of said photodiode;
   (b) rectifier means operatively connected to the photodiode for rectifying a low-frequency voltage resulting from the superimposition of said low-frequency current; and
   (c) an output terminal connected to an output of the rectifier means.

2. The circuit of claim 1, including a logarithmizer arranged between the rectifier means and the output terminal.

3. The circuit of claim 1, wherein the photo-electric current of the photodiode is conducted via a current adder that includes an input connected to a low-frequency signal generator.

4. The circuit of claim 1, including a control means for maintaining constant photo-electric current; and wherein a rated value is supplied to a rated value input of the control means, said control means being supplied with a low-frequency voltage whose frequency is lower than a cut-off frequency of the closed control circuit.

5. The circuit of claim 1, wherein the photodiode is an avalanche photodiode; and wherein the modulation means is part of a control means for setting optimum multiplication factor.

6. The circuit of claim 1, wherein the photodiode is an avalanche photodiode; and the circuit further comprises means for turning off the modulation of the diode current when amplification of the diode current falls below a prescribed value of the multiplication factor of said photodiode.

7. The circuit of claim 1, wherein the rectifier means comprises a synchronous rectifier that is connected to the photodiode and to the low-frequency signal generator.

8. The circuit of claim 2, comprising means for measuring current arranged in series with the photodiode, said means for measuring current providing an impressed current to the logarithmizer; and a voltage-to-current converter arranged between said rectifier means and said logarithmizer.

9. The circuit of claims 1, comprising an impedance converter arranged between said photodiode and said rectifier means.

10. A circuit comprising:
   (a) a photodiode;
   (b) a bias voltage source operatively coupled to said photodiode;
   (c) a controller operatively coupled to said photodiode for controlling bias voltage based on light power received by said photodiode;
   (d) a modulator operatively coupled to said photodiode for superimposing a low frequency current signal on a photoelectric current created in said photodiode, said superimposition creating a resulting low frequency voltage signal;

(e) a rectifier operatively coupled to said photodiode, said rectifier rectifying said resulting low frequency voltage signal; and (f) an output terminal operatively coupled to said rectifier at which the rectified low frequency voltage signal is made available.

11. The circuit of claim 10, including a logarithmizer coupled between said rectifier and said output terminal.

12. The current of claim 10, wherein said modulator includes a current adder coupled to the low frequency current source.

13. The circuit of claim 10, including:

(a) a subcircuit for maintaining a constant photoelectric current, the subcircuit having a rated valve input; and (b) a rated valve supply coupled to said rated valve input comprising a low frequency voltage signal having a frequency that is lower than a limit frequency of the closed control circuit.

14. The circuit of claim 11, wherein said rectifier comprises a synchronous rectifier coupled to said photodiode and said low frequency signal generator.

15. A circuit in an optical receiver having a photodiode, comprising:

(a) a modulator coupled to said photodiode, said modulator superimposing a constant amplitude low frequency current on photoelectric current generated in said photodiode upon receipt of light power to produce a resulting low frequency voltage signal; and (b) a rectifier coupled to said photodiode to rectify the resulting low frequency voltage signal, said rectifier having an output signal representative of light power received by said photodiode.

16. The circuit of claim 15, further comprising a logarithmizer coupled to said output of said rectifier.

17. The circuit of claim 15, wherein the photodiode is an avalanch-type photodiode.

18. The circuit of claim 15, wherein said modulator comprises a current adder coupled to a low frequency signal source.

19. The circuit of claim 15, further comprising means for shutting off control of photodiode current wherein amplification of said photodiode current falls below a prescribed valve.

20. The circuit of claim 15, wherein an impedance matching circuit is coupled between said photodiode and said rectifier.

* * * * *